(12) United States Patent
Ayyapureddi

(10) Patent No.: US 12,536,096 B2
(45) Date of Patent: Jan. 27, 2026

(54) APPARATUSES AND METHODS FOR SETTINGS FOR ADJUSTABLE WRITE TIMING

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/441,775

(22) Filed: Feb. 14, 2024

(65) Prior Publication Data
US 2024/0289266 A1 Aug. 29, 2024

Related U.S. Application Data

(60) Provisional application No. 63/486,601, filed on Feb. 23, 2023.

(51) Int. Cl.
*G06F 12/02* (2006.01)
(52) U.S. Cl.
CPC ................ *G06F 12/0223* (2013.01)
(58) Field of Classification Search
CPC ............. G06F 12/02; G06F 12/0223
See application file for complete search history.

(56) References Cited

U.S. PATENT DOCUMENTS

| | | | |
|---|---|---|---|
| 5,434,814 A | 7/1995 | Cho et al. | |
| 6,249,476 B1 | 6/2001 | Yamazaki et al. | |
| 7,117,421 B1 | 10/2006 | Danilak | |
| 9,158,617 B2 | 10/2015 | Cho et al. | |
| 9,201,728 B2 | 12/2015 | Patapoutian et al. | |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

D. Chen et al., "CATCAM: Constant-time Alteration Ternary CAM with Scalable In-Memory Architecture," 2020 53rd Annual IEEE/ACM International Symposium on Microarchitecture (Micro), Athens, Greece, 2020, pp. 342-355.*

(Continued)

*Primary Examiner* — Pierre Michel Bataille
(74) *Attorney, Agent, or Firm* — Dorsey & Whitney LLP

(57) ABSTRACT

Apparatuses, systems, and methods for adjustable write timing. Memory devices include a first data terminal and a second data terminal. As part of an access operation a first set of data and a first set of metadata may be sent/received across the first terminal and a second set of data and a second set of metadata may be sent/received across the second terminal. When a first setting is enabled, the first set of metadata may be stored in a first location and the second set of metadata may be stored in a second location in the memory array, such as a first and second column plane. The two locations may be remote from each other. When disabled, the metadata may be stored in a single location. A second setting may be used to adjust a write delay to account for different timing when the first setting is enabled vs disabled.

20 Claims, 6 Drawing Sheets

(56) References Cited

U.S. PATENT DOCUMENTS

| | | |
|---|---|---|
| 9,361,960 B2 | 6/2016 | Vogelsang |
| 9,547,550 B1 | 1/2017 | Thakore et al. |
| 9,607,679 B1 | 3/2017 | Kim et al. |
| 9,666,291 B2 | 5/2017 | Park |
| 9,880,901 B2 | 1/2018 | Zastrow |
| 9,996,799 B2 | 6/2018 | Bostick et al. |
| 10,127,101 B2 | 11/2018 | Halbert et al. |
| 10,222,989 B1 | 3/2019 | Zitlaw |
| 10,243,590 B1 | 3/2019 | Seshadri |
| 10,810,079 B2 | 10/2020 | Halbert et al. |
| 10,817,371 B2 | 10/2020 | Rooney et al. |
| 10,872,011 B2 | 12/2020 | Bains et al. |
| 10,929,033 B2 | 2/2021 | Meeker et al. |
| 10,937,517 B1 | 3/2021 | Rich-Plotkin et al. |
| 11,010,304 B2 | 5/2021 | Kang et al. |
| 11,074,126 B2 | 7/2021 | Prather et al. |
| 11,088,710 B2 | 8/2021 | Lee et al. |
| 11,200,961 B1 | 12/2021 | Uribe |
| 11,264,085 B1* | 3/2022 | Ware .................... G06F 13/1678 |
| 11,538,515 B2 | 12/2022 | Ji et al. |
| 11,579,971 B2 | 2/2023 | Ayyapureddi |
| 11,580,038 B2 | 2/2023 | Norman et al. |
| 11,615,861 B2 | 3/2023 | Kim et al. |
| 12,001,707 B2 | 6/2024 | Boehm et al. |
| 12,014,797 B2 | 6/2024 | Ayyapureddi |
| 12,019,513 B2 | 6/2024 | Ayyapureddi |
| 12,204,410 B2 | 1/2025 | Sutera et al. |
| 12,204,770 B2* | 1/2025 | Ayyapureddi ........ G06F 3/0679 |
| 12,230,347 B2* | 2/2025 | Suh .................... G06F 11/1048 |
| 12,249,393 B2 | 3/2025 | Reohr |
| 2003/0081492 A1 | 5/2003 | Farrell et al. |
| 2006/0233030 A1 | 10/2006 | Choi |
| 2008/0089129 A1 | 4/2008 | Lee |
| 2008/0313493 A1 | 12/2008 | Roohparvar et al. |
| 2009/0097348 A1 | 4/2009 | Minzoni et al. |
| 2009/0132876 A1 | 5/2009 | Freking et al. |
| 2009/0168523 A1 | 7/2009 | Shirakawa et al. |
| 2009/0196103 A1 | 8/2009 | Kim et al. |
| 2010/0177582 A1 | 7/2010 | Kim et al. |
| 2010/0177587 A1 | 7/2010 | Huang |
| 2010/0290146 A1 | 11/2010 | Lam |
| 2011/0154158 A1 | 6/2011 | Yurzola et al. |
| 2013/0117630 A1 | 5/2013 | Kang |
| 2014/0126300 A1 | 5/2014 | Takahashi et al. |
| 2015/0193464 A1 | 7/2015 | Kwon et al. |
| 2015/0262631 A1 | 9/2015 | Shimizu |
| 2016/0070507 A1 | 3/2016 | Hoshikawa et al. |
| 2016/0092307 A1 | 3/2016 | Bonen et al. |
| 2016/0125920 A1 | 5/2016 | Kim et al. |
| 2016/0307645 A1 | 10/2016 | Kim et al. |
| 2017/0060681 A1 | 3/2017 | Halbert et al. |
| 2017/0062067 A1 | 3/2017 | Yang et al. |
| 2017/0091025 A1 | 3/2017 | Ahn et al. |
| 2017/0192843 A1 | 7/2017 | Warnes et al. |
| 2017/0249097 A1 | 8/2017 | Eguchi |
| 2017/0269992 A1 | 9/2017 | Bandic et al. |
| 2017/0285990 A1 | 10/2017 | Chen et al. |
| 2017/0286213 A1 | 10/2017 | Li |
| 2017/0344423 A1 | 11/2017 | Hsiao et al. |
| 2018/0025760 A1 | 1/2018 | Mazumder et al. |
| 2018/0121283 A1 | 5/2018 | Plants |
| 2018/0150350 A1 | 5/2018 | Cha et al. |
| 2019/0066816 A1 | 2/2019 | Dono |
| 2019/0073261 A1 | 3/2019 | Halbert et al. |
| 2019/0103154 A1 | 4/2019 | Cox et al. |
| 2019/0197171 A1 | 6/2019 | Tiwari et al. |
| 2019/0206478 A1 | 7/2019 | Jun |
| 2019/0362792 A1 | 11/2019 | Oh et al. |
| 2019/0369893 A1 | 12/2019 | Ross |
| 2020/0019462 A1 | 1/2020 | Prather et al. |
| 2020/0051616 A1 | 2/2020 | Cho |
| 2020/0104205 A1 | 4/2020 | Noguchi et al. |
| 2020/0104208 A1 | 4/2020 | Heo et al. |
| 2020/0194050 A1 | 6/2020 | Akamatsu |
| 2020/0226039 A1 | 7/2020 | Lee |
| 2020/0373941 A1 | 11/2020 | Latorre et al. |
| 2021/0011645 A1 | 1/2021 | Martinelli et al. |
| 2021/0012817 A1 | 1/2021 | Laurent et al. |
| 2021/0012849 A1 | 1/2021 | Kim et al. |
| 2021/0057003 A1 | 2/2021 | Prather et al. |
| 2021/0064119 A1 | 3/2021 | Mirichigni et al. |
| 2021/0064282 A1 | 3/2021 | He et al. |
| 2021/0064461 A1* | 3/2021 | Veches ................ G06F 11/1044 |
| 2021/0064467 A1* | 3/2021 | Buerkle ............. G06F 11/1076 |
| 2021/0083687 A1 | 3/2021 | Lee et al. |
| 2021/0142848 A1 | 5/2021 | Lim et al. |
| 2021/0142860 A1 | 5/2021 | Song et al. |
| 2021/0200630 A1 | 7/2021 | Ishikawa et al. |
| 2021/0208967 A1 | 7/2021 | Cha et al. |
| 2021/0224155 A1 | 7/2021 | Bains et al. |
| 2021/0247910 A1 | 8/2021 | Kim et al. |
| 2021/0272627 A1 | 9/2021 | Lee |
| 2021/0294692 A1 | 9/2021 | Chen |
| 2021/0311821 A1 | 10/2021 | Ryu et al. |
| 2021/0311822 A1 | 10/2021 | Jannusch et al. |
| 2021/0311830 A1 | 10/2021 | Lee |
| 2021/0357287 A1 | 11/2021 | Kim et al. |
| 2021/0358559 A1 | 11/2021 | Suh et al. |
| 2021/0365316 A1 | 11/2021 | Nale et al. |
| 2021/0406123 A1 | 12/2021 | Nakanishi et al. |
| 2022/0027090 A1 | 1/2022 | Kwon et al. |
| 2022/0035529 A1 | 2/2022 | Bennett |
| 2022/0084565 A1 | 3/2022 | Prather et al. |
| 2022/0091938 A1 | 3/2022 | Buerkle et al. |
| 2022/0129196 A1 | 4/2022 | Roberts et al. |
| 2022/0138065 A1 | 5/2022 | Secatch et al. |
| 2022/0197739 A1 | 6/2022 | Ryu et al. |
| 2022/0261310 A1 | 8/2022 | Ishikawa et al. |
| 2022/0334917 A1 | 10/2022 | Veches |
| 2022/0337271 A1 | 10/2022 | Hanna |
| 2022/0365692 A1 | 11/2022 | Vankamamidi et al. |
| 2022/0398042 A1 | 12/2022 | Song et al. |
| 2022/0415398 A1 | 12/2022 | Lien et al. |
| 2023/0146549 A1 | 5/2023 | Lien et al. |
| 2023/0161665 A1 | 5/2023 | Choi et al. |
| 2023/0185665 A1 | 6/2023 | Ayyapureddi |
| 2023/0223096 A1 | 7/2023 | Bains et al. |
| 2023/0236747 A1* | 7/2023 | Curewitz ............ G06F 12/0873 |
| | | 711/206 |
| 2023/0289072 A1 | 9/2023 | Cho et al. |
| 2023/0298682 A1 | 9/2023 | Suh et al. |
| 2023/0350581 A1* | 11/2023 | Ayyapureddi ........ G06F 3/0622 |
| 2023/0350748 A1 | 11/2023 | Ayyapureddi |
| 2023/0352064 A1 | 11/2023 | Ayyapureddi |
| 2023/0352112 A1 | 11/2023 | Ayyapureddi |
| 2024/0079074 A1 | 3/2024 | Bak et al. |
| 2024/0086520 A1 | 3/2024 | Kaplan et al. |
| 2024/0096404 A1 | 3/2024 | Cho et al. |
| 2024/0126438 A1 | 4/2024 | Suh et al. |
| 2024/0160351 A1 | 5/2024 | Ayyapureddi et al. |
| 2024/0160524 A1 | 5/2024 | Ayyapureddi et al. |
| 2024/0160527 A1 | 5/2024 | Ayyapureddi et al. |
| 2024/0161855 A1 | 5/2024 | Smith et al. |
| 2024/0161856 A1 | 5/2024 | Smith et al. |
| 2024/0161859 A1 | 5/2024 | Ayyapureddi et al. |
| 2024/0170088 A1 | 5/2024 | Smith et al. |
| 2024/0176699 A1 | 5/2024 | Ayyapureddi et al. |
| 2024/0177794 A1 | 5/2024 | Vogelsang |
| 2024/0220149 A1 | 7/2024 | Kim et al. |
| 2024/0248796 A1 | 7/2024 | Ayyapureddi |
| 2024/0256380 A1 | 8/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0321328 A1 | 9/2024 | Ayyapureddi |
| 2024/0377952 A1* | 11/2024 | Song .................... G06F 3/0634 |
| 2024/0394178 A1 | 11/2024 | Partsch |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |

(56) References Cited

U.S. PATENT DOCUMENTS

| | | |
|---|---|---|
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0110830 A1 | 4/2025 | Ayyapureddi |
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | |
|---|---|---|
| WO | 2024107503 A1 | 5/2024 |
| WO | 2024107504 A1 | 5/2024 |
| WO | 2025053912 A1 | 3/2025 |
| WO | 2025075696 A1 | 4/2025 |
| WO | 2025075697 A1 | 4/2025 |

OTHER PUBLICATIONS

J. F. P. Marchand, "An alterable programmable logic array," in IEEE Journal of Solid-State Circuits, vol. 20, No. 5, pp. 1061-1066, Oct. 1985.*

U.S. Appl. No. 18/734,189, titled "Apparatuses, Systems, and Methods for Managing Metadata Storage at a Memory" filed Jun. 5, 2024, pp. all pages of application as filed.

U.S. Appl. No. 18/743,994 titled "Apparatuses and Methods for Shared Codeword in 2-Pass Access Operations" filed Jun. 14, 2024, pp. all pages of the application as filed.

U.S. Appl. No. 18/745,577 titled "Apparatuses and Methods for Half-Page Modes of Memory Devices" filed Jun. 17, 2024, pp. all pages of the application as filed.

U.S. Appl. No. 18/745,843 titled "Apparatuses and Methods for Half-Page Modes of Memory Devices" filed Jun. 17, 2024, pp. all pages of the application as filed.

U.S. Appl. No. 18/745,877 titled "Apparatuses and Methods for Half-Page Modes of Memory Devices" filed Jun. 17, 2024, pp. all pages of the application as filed.

U.S. Appl. No. 18/745,894 titled "Apparatuses and Methods for Half-Page Modes of Memory Devices" filed Jun. 17, 2024, pp. all pages of the application as filed.

U.S. Appl. No. 18/747,658, titled "Apparatuses and Methods for Bounded Fault Compliant Metadata Storage" filed, pp. all pages of application as filed.

U.S. Appl. No. 18/747,676, titled "Apparatuses and Methods for Alternate Memory Die Metadata Storage", filed Jun. 19, 2024, pp. all pages of application as filed.

U.S. Appl. No. 18/747,696, titled "Apparatuses and Methods for Scalable 1-Pass Error Correction Code Operations", filed Jun. 19, 2024, pp. all pages of application as filed.

U.S. Appl. No. 18/747,712, titled "Apparatuses and Methods for Granular Single-Pass Metadata Access Operations" filed Jun. 19, 2024, pp. all pages of application as filed.

U.S. Appl. No. 18/747,635, titled "Apparatuses and Methods for Read/Modify/Write Single-Pass Metadata Access Operations" filed Jun. 19, 2024, pp. all pages of application as filed.

U.S. Appl. No. 18/625,539, titled "Apparatuses, Systems, and Methods for Per Row Error Scrub Information" filed Apr. 3, 2024, pp. all pages of application as filed.

U.S. Appl. No. 19/025,934, titled "Apparatuses, Systems, and Methods for Managing Metadata Security and Access" filed Jan. 16, 2025, pp. all pages of application as filed.

PCT Application No. PCT/US24/39192 titled "Apparatuses and Methods for Scalable 1-Pass Error Correction Code Operations" filed Jul. 23, 2024, pp. all pages of the application as filed.

PCT Application No. PCT/US24/39195 titled "Apparatuses and Methods for Half-Page Modes of Memory Devices" filed Jul. 23, 2024, pp. all pages of the application as filed.

PCT Application No. PCT/US24/39231 titled "Apparatuses and Methods for Granular Single-Pass Metadata Access Operations" filed Jul. 24, 2024, pp. all pages of the application as filed.

U.S. Appl. No. 18/441,830 titled "Apparatuses, Systems, and Methods for Storing and Accessing Memory Metadata and Error Correction Code Data" filed Feb. 14, 2024, pp. all pages of the application as filed.

Lumenci Team "High Bandwidth Memory (HBM3)" https://lumenci.com/blogs/high-bandwidth-memory; Editorial Team at Lumenci, Jul. 14, 2022; pp. 1-3.

U.S. Appl. No. 18/424,282 titled "Apparatuses and Methods for Bounded Fault Compliant Metadata Storage" filed Jan. 26, 2024; pp. all pages of application as filed.

U.S. Appl. No. 18/424,342 titled "Apparatuses and Methods for Bounded Fault Compliant Metadata Storage" filed Jan. 26, 2024; pp. all pages of application as filed.

U.S. Appl. No. 18/430,381, titled "Apparatuses, Systems, and Methods for Storing Memory Metadata", filed Feb. 1, 2024; pp. all pages of application as filed.

U.S. Appl. No. 18/430,406, titled "Apparatuses, Systems, and Methods for Storing Memory Metadata", filed Feb. 1, 2024; pp. all pages of application as filed.

U.S. Appl. No. 18/431,232, titled "Apparatuses, Systems, and Methods for Storing Memory Metadata", filed Feb. 2, 2024; pp. all pages of application as filed.

U.S. Appl. No. 18/431,306, titled "Apparatuses, Systems, and Methods for Storing Memory Metadata", filed Feb. 2, 2024; pp. all pages of application as filed.

U.S. Appl. No. 18/504,215 titled "Apparatuses and Methods for Enhanced Metadata Support" filed Nov. 8, 2023; pp. all pages of application as filed.

U.S. Appl. No. 18/504,234 titled "Apparatuses and Methods for Enhanced Metadata Support" filed Nov. 8, 2023; pp. all pages of application as filed.

U.S. Appl. No. 18/504,302 titled "Apparatuses and Methods for Configurable ECC Modes" filed Nov. 8, 2023; pp. all pages of application as filed.

U.S. Appl. No. 18/504,316 titled "Apparatuses and Methods for Configurable ECC Modes" filed Nov. 8, 2023; all pages of application as filed.

U.S. Appl. No. 18/504,324 titled "Apparatuses and Methods for Single-Pass Access of ECC Information, Metadata Information or Combinations Thereof" filed Nov. 8, 2023, all pages of application as filed.

U.S. Appl. No. 18/504,342 titled "Apparatuses and Methods for Single-Pass Access of ECC Information,Metadata Information or Combinations Thereof" filed Nov. 8, 2023; pp. all pages of application as filed.

U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.

U.S. Appl. No. 18/504,362 titled "Apparatuses and Methods for Separate Write Enable for Single-Pass Access of Data, Metadata, and Parity Information" filed Nov. 8, 2023; pp. all pages of application as filed.

U.S. Appl. No. 19/360,159 titled "Apparatuses and Methods for Enhanced Metadata Support" filed Oct. 16, 2025; pp. all pages of the application as filed.

U.S. Appl. No. 19/366,908 titled "Apparatuses and Methods for Configurable Ecc Modes", filed Oct. 23, 2025; pp. all pages of application as filed.

U.S. Appl. No. 19/376,027 titled "Apparatuses and Methods for Single-Pass Access of ECC Information, Metadata Information or Combinations Thereof", filed Oct. 31, 2025; pp. all pages of application as filed.

* cited by examiner

500

| Setting | Value | Effect |
| --- | --- | --- |
| BFMD_storage | Enable | MD Stored in 2 CPs |
| | Disable | MD Stored in 1 CP |
| BFMD_writetiming | Enable | Increase Write Delay |
| | Disable | Normal Write Delay |
| BFMD_override | Enable | MD Stored in 1 CP |
| | Disable | BFMD_Storage Controls |

FIG. 5

APPARATUSES AND METHODS FOR SETTINGS FOR ADJUSTABLE WRITE TIMING

CROSS-REFERENCE TO RELATED APPLICATIONS

This application claims the filing benefit of U.S. Provisional Application No. 63/486,601, filed Feb. 23, 2023. This application is incorporated by reference herein in its entirety and for all purposes.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed.

The memory may be operated based on a minimum timing after each operation before a next operation can be performed. The timing may be based on a specification of the memory which is based, in part, on how long it takes the memory to perform a given operation. Different memory architectures may operate at different speeds. There may be a need for various settings which allow both the memories themselves and the controller to account for different architectures and operating conditions.

BRIEF DESCRIPTION OF THE DRAWINGS

FIG. 5 is a diagram of an example settings register according to some embodiments of the present disclosure.

DETAILED DESCRIPTION

Figure 1:
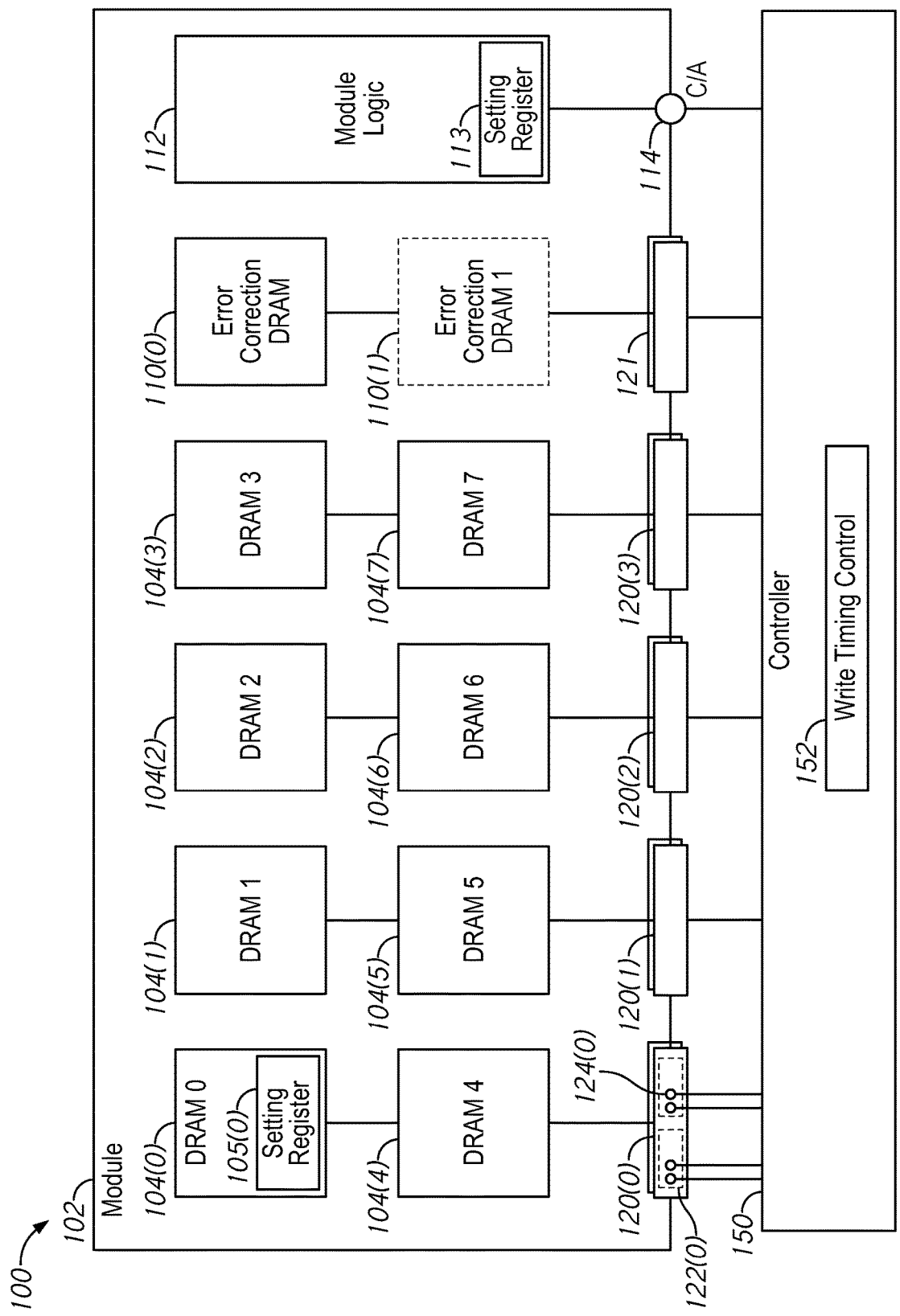
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may prefetch a codeword (e.g., a number of bits of data) along with one or more associated bits from the memory and either replace the prefetched data with new data (e.g., as part of a write operation) or provide the prefetched data off the memory device (e.g., as part of a read operation). Some memory modes may involve providing less than all of the prefetched data off the memory device. For example, in a conventional memory device, in certain modes half of the prefetched data may be provided off the device, and the remainder may ignored.

Memory devices may store additional information which is associated with each codeword. For example, the additional information may include parity bits which are used as part of an error correction scheme, metadata which includes information about the data codeword (or is a portion of information about a larger set of data which includes the codeword), or combinations thereof.

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 4 bits) may not have any meaning on their own, but may have meaning when combined with sets of metadata bits retrieved as part of other access operations (e.g., to other memory arrays and/or to the same array at different times).

Memory devices may be packaged together onto a memory module. The memory module may include a number of memory devices, each of which stores data, and one or more error correction memory devices, which may store information used to correct errors when data is read out from the memory. For example, each memory device may have a number of input/output (or DQ) terminals. Each DQ terminal may send or receive a burst of serial data from/to the associated memory. Some memory module architectures may use the error correction memory devices to be able to correct up to one DQ terminal (or one set of DQ terminals) worth of data. The memory module may have error correction/repair capabilities. Different architectures of memory module may have different levels of protection, for example some architectures may be able to repair or restore information along all of the DQ terminals of a memory device, while other architectures may only be able to repair information along a portion of the DQ terminals (e.g., along a single DQ terminal).

When the memory module is only capable of protecting a portion of the DQ terminals, it may be useful to make the memory 'bounded fault compliant' such that errors are likely to be localized within the portion which can be repaired. Since faults may generally be location specific, when bounded fault compliance is called for, the metadata from different DQ terminals (or different sets of DQ terminals) may be split into different locations within the memory array. However, this split may change the write timing of the devices on the module, as splitting the metadata into different portions may increase an amount of time a write operation takes. Accordingly, the write timing may change based on whether the memory device is in an architecture where bounded fault compliance is called for or not. Since the memory and the controller do not inherently know the architecture of the module, various settings may be useful to allow proper write timing performance.

The present disclosure is drawn to apparatuses, systems, and methods for settings for adjustable write timing. A memory device when packaged on a first type of memory module may not have bounded fault compliance (e.g., because the first memory module is capable of correcting data across all DQs) while the same memory device, when packaged on a second type of memory module may wish to have bounded fault compliance. Accordingly, the memory device may include a first setting (e.g., a fuse, a mode register, etc.) which enables or disables bounded fault compliance for metadata. For example, when the first setting enables bounded fault compliance for metadata, the metadata data from different DQ terminals may be saved in different locations within the array to reduce the likelihood of a single fault corrupting the metadata across multiple DQs. However, this may increase the write timing of the memory device (as described in more detail herein).

A second setting (e.g., a mode register, fuse, and/or Serial Presence Detect (SPD)) may be used to inform the memory controller that the module (and/or individual memory devices) are operating under a bounded fault compliant metadata system. The module may read this information and write timing control circuits of the controller may adjust to take into account the write timing of the memory.

In some embodiments, the memory device (and/or module) may have a third setting which may be used as an override. For example, some users of the memory may prefer to operate at a higher rate of speed even if that incurs a risk of bounded fault errors. Accordingly, the third setting may act to override the first setting, and may disable the storage of metadata in different locations even if it would otherwise be enabled.

In some embodiments, any combination of the two or more of the settings may be combined. For example, a single setting may indicate that bounded fault compliant metadata storage should be used, and that same setting may be read by a controller to determine the write timing to use.

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data and may generally be referred to as data memory devices 104, while the memory device 110 is used to correct errors in data read from the data memory devices 104. The memory device 110 may be referred to as an error correction memory device 110. A module logic 112 receives commands and addresses over a command/address C/A bus from the controller 150 through a C/A terminal 114 and distributes those commands and addresses to the memory devices 104 and 110 over internal command and address buses (not shown). Data is communicated between the controller 150 and the module 102 along data buses which couple to data terminals (DQ) terminals 124 of the module 102. The data terminals 124 are organized into pseudo-channels 122 and channels 120 and 121. Each channel 120 and 121 is a set of data terminals 124 associated with a memory device 104. However, for the sake of clarity, individual pseudo-channels and data terminals are only shown for the first channel 120(0).

The present embodiment may be described with respect to a 9×2p2 memory module or a 10×2p2 memory module 102. In the 9×2p2 architecture, there are nine total memory devices 104 and 110. Eight data memory devices 104(0) to 104(7) and one error correction memory device 110(0). In the 10×2p2 architecture, there are 10 total memory devices 104 and 110. Eight data memory devices 104(0) to 104(7) and two error correction memory devices 110(0) and 110(1). The increased number of error correction devices 110 may enable the controller 150 of the 10×2p2 module 102 to correct more errors than when the module set up in the 9×2p2 configuration. For example, the 10×2p2 module may enable the correction errors along both DQ terminals 124 in a pseudo-channel 122, thus rendering bounded fault compliance moot, while the 9×2p2 module may enable correction of errors along only a single DQ terminal 124 in a pseudo-channel 122. Since the components and operations may generally be similar between 10×2p2 and 9×2p2 modules, FIG. 1 will generally be described in a manner which applies to either 10×2p2 or 9×2p2 modules, except as noted.

Each channel 120 and 121 includes one or more pseudo-channels 122, which may be operated independently of each other. In this embodiment, each channel 120 and 121 includes two pseudo-channels 122, each of which includes two data terminals 124. Since the memory devices and channels may generally be similar to each other, only a single device 104(0) and its associate channel 120(0) are described in detail herein. In order to simplify the layout of the figure, an arrangement of two rows of four devices 104 each is shown, and their associated channels 120 for the two vertically aligned devices 104 are shown as stacked boxes. However the representation of FIG. 1 does not necessarily represent the layout of a physical device. For example, a single row of 8 devices 104 may be used. Similarly, various buses and signal lines have been simplified down to a single line for clarity on the drawing, however, multiple physical signal lines may be represented by a single line in the drawing.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data. For example, each terminal receives 32 data bits in series, for a total of 64 data bits. The controller 150 may also provide metadata bits. In the described embodiments, either 4 bytes of metadata or 8 bytes of metadata are stored on the module 102 per access operation. These metadata bytes are distributed across the data devices 104 of the module. Since there are 8 total data devices 104, in the embodiment where there are 4 bytes of metadata, each device stores 4 bits of metadata per access operation. In the embodiment where there are 8 bytes of metadata, each device 104 stores 8 bits of metadata. With two DQ terminals 124 per pseudo-channel 122, a total of 2 or 4 bits may be received per DQ terminal for the 4 byte and 8 byte embodiments respectively. Accordingly, during the write operation, a total of 34 bits or 36 bits per DQ terminal are sent by the controller 150 and received by the DQ terminal 124, 32 bits of data and either 2 or 4 bits of metadata. In some embodiments, the burst may be organized so that the data and metadata are sequential (e.g., 32 consecutive data bits and then 2 or 4 consecutive metadata bits). Other arrangements of the burst may be used in other example embodiments (e.g., metadata first, metadata interspersed among the data bits, etc.). The data is written to a location specified by the address in the data memory devices 104.

During an example read operation, the controller 150 provides a read command and addresses along the C/A terminal 114. The module logic 112 distributes these to the memory devices 104 to 110 and data and metadata is read out from the locations specified by the addresses. Each DQ terminal 124 provides 32 bits of read data and 2 or 4 bits of read metadata, for a total of 64 data bits per device 104 and 4 or 8 bits of metadata per device 104.

The read and write operations may use a single-access pass to store both the data (as well as parity generated based on the data) along with the metadata bits. Each memory device may be capable of accessing up to 136 bits in a single access pass (e.g., generally 128 data bits and 8 parity bits). In the 9×2p2 or 10×2p2 architecture, 64 data bits plus 4 or 8 metadata bits are used (along with some number of parity bits, for example 8 parity bits). Accordingly, the data (plus parity) and metadata may all be accessed as a single access pass. For example, as explained in more detail herein, the memory array may be split into two portions, each of which is associated with a value of a column plane select bit in the column address. Data may be stored in a selected one of the portions, while the metadata may be stored in the non-selected portion.

When bounded fault compliant metadata storage is used, to reduce the likelihood that errors in the metadata propagate across multiple DQ terminals, the metadata associated with each DQ terminal may be stored in a different location in the memory array within that device. The different locations may be remote from each other such that a defect which effects one location is unlikely to affect both. The memory device 104 may use settings to determine when to enable/disable bounded fault compliant metadata storage and internal logic to determine where to store the metadata, as described in more detail herein.

During an example read operation, the error correction memory device(s) 110 may be used to identify and correct errors in the data. The controller 150 may store repair information in the error correction devices 110 during a write operation through channel 121, and then read that repair operation back out through the channel 121 during a read operation. An error correction circuit (not shown) of the controller 150 may use that repair information to locate and repair errors in the data and metadata read across the other channels 120.

Depending on the architecture of the memory, different levels of error may be repaired. In a 9×2p2 memory module, the single error correction memory device 110(0) may enable correction of the data along one DQ terminal (e.g., the 34 or 36 bits provided along one of the terminals 124 in a pseudo-channel). For example, if the data being provided along a first DQ terminal in a first pseudo-channel associated with memory 104(0) is corrupted, then the controller 150 is able to repair that information based on the amount of repair information stored in a single error correction device 110. However, if the errors exist in bits across both DQ terminals in the pseudo-channel then correction may not be possible. In a 10×2p2 memory module, there are two error correction memory devices 110(0) and 110(1) and the corresponding increase in repair information may allow the controller 150 to correct/repair errors in the bits across both DQ terminals. Accordingly, bounded fault compliance may be needed in a 9×2p2 module, but not in a 10×2p2 module.

Each memory device may include a setting register 105. The setting register represents various locations which the memory may use to store information which defines various settings of the memory. For example, the setting register 105 may include information stored in a mode register, fuse array, or combinations thereof. The setting register 105 includes a bounded fault compliant metadata setting which enables or disables bounded fault compliant storage of metadata (BFMD storage). For example, when BFMD storage is disabled, the memory may receive metadata bits along multiple DQ terminals, and store those bits in a single location, such as in a single column plane of the non-selected portion of the memory array. When BFMD storage is enabled, the metadata bits from different DQ terminals may be stored in different locations, such as in two different column planes in the non-selected portion of the memory array. For example, the metadata associated with a first DQ terminal is stored in a first column plane and metadata associated with a second DQ terminal is stored in a second column plane. When BFMD storage is enabled, the metadata may be stored in two locations of the non-selected portion which are remote from each other, such that a failure which effects one location is unlikely to also affect the other location.

The BFMD storage setting may generally be enabled or disabled based on the type of memory module 102 that the memory devices 104 are packaged on. For example, when the memory devices are assembled onto a 10×2p2 module 102, the BFMD storage setting in the setting registers 105 of those devices may be disabled. When the memory devices 104 are assembled onto a 9×2p2 module 102, the BFMD storage setting in the setting registers 105 of those devices 104 may be enabled.

When BFMD is enabled, write operations may take more time than when BFMD storage is disabled. For example, the number of metadata bits written to each column plane may be less than the total number of bitlines which are activated at one time. To protect the data along the active bit lines which are not being written to, a read/modify/write (RMW) cycle may be used where the data along all the active bit lines is read out, the new metadata bits are used to overwrite certain of this bits, and then the modified bits are written back. For example, this may roughly double the length of a write operation.

The controller 150 includes a write timing control circuit 152, which determines the minimum time after a write operation before another command can be sent. The write timing control circuit 152 may adjust the timing based on one or more settings. For example, the setting registers 105 in the memory devices 104 and/or a setting register 113 associated with the module 102 as a whole includes a BFMD write timing setting which may be read by the controller 150 and used by the write timing control 152 to determine the write timing. In some embodiments, the setting register 113 may be an SPD of the module 102. In some embodiments, the BFMD storage setting may be used as the BFMD write timing setting. In some embodiments, the BFMD write timing setting may be separate from the BFMD storage setting.

Based on the BFMD write timing setting, the write timing control 152 may use a first timing or a second timing for write operations. For example, if the BFMD write timing setting is in a first state (e.g., BFMD storage is disabled) then the write timing control may wait at least a first amount of time after sending a write command before the controller 150 sends another command. If the BFMD write timing setting is in a second state (e.g., BFMD storage is enabled) then the write timing control circuit 152 may wait at least a second amount of time after sending a write command before the controller 150 sends another command. The second amount of time may be longer than the first amount of time. In some embodiments, the second amount of time may be roughly double the first amount of time.

In some embodiments, one or more of the settings may be permanent (or otherwise difficult to overwrite). For example, the BFMD storage setting may be stored in a fuse array, or a read only mode register, or in some other form where it is difficult to change. In some embodiments, the setting registers 105 may include a BFMD override setting. This is a setting which may be applied to determine whether BFMD storage is used, regardless of the state of the BFMD storage setting. For example, is BFMD override is disabled, then the BFMD storage setting may determine if BFMD storage is used. If BFMD override is enabled, then BFMD storage is not used, regardless of the state of the BFMD storage setting.

In some embodiments, each memory device 104 may also have its own separate error correction, for example an error correction code (ECC) circuit which can repair one or more bits of error in the codeword. For example, each memory 104 may implement single error correction (SEC) and correct up to 1 bit of error in the 64 bits read out as part of a read command. The ECC circuits in each of the memory devices 104 may generate parity bits when the data/metadata is written, and then may use those parity bits to detect and/or correct errors. The parity bits may generally stay within the devices 104, and not be read out to the controller 150.

Figure 2:
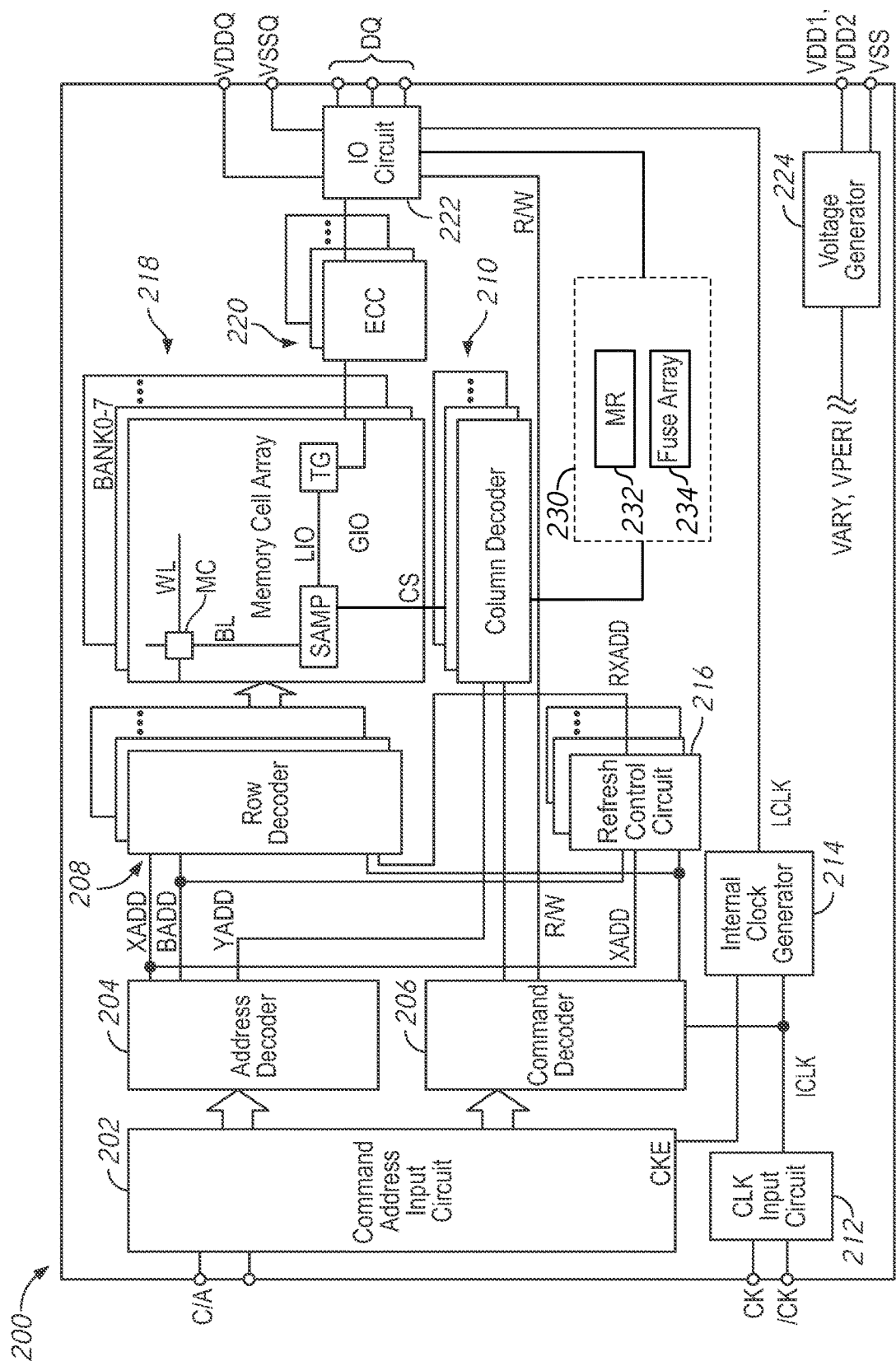
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. For example, the device 100 may implement one of the devices 104 of the module 102 of FIG. 1.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data and metadata from the bit line BL is amplified by the sense amplifier SAMP, and transferred to an ECC circuit 220 over local data lines (LIO), transfer gate (TG), and global data lines (GIO). Conversely, write data and metadata outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and /CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and /CK that are provided to an input circuit 212. The external clocks may be complementary. The input circuit 212 generates an internal clock ICLK based on the CK and /CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. The address decoder 204 may also supply a decoded bank address BADD, which may indicate the bank of the memory array 218 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 202. The command decoder 206 includes circuits to decode the internal command signals to generate various internal signals and commands for performing operations. For example, the command decoder 206 may provide signals which indicate if data is to be read, written, etc.

The device 200 may receive an access command which is a write command. When the write command is received, and a bank address, a row address and a column address are timely supplied with the write command, write data and metadata supplied to the data terminals DQ by the controller is provided along the data bus and written to memory cells in the memory array 218 corresponding to the row address and column address. The write command is received by the command decoder 206, which provides internal commands so that the write data along with metadata is received by data receivers in the input/output circuit 222. The write data and metadata is supplied via the input/output circuit 222 to the ECC circuit 220. The ECC circuit generates parity bits based on the received data and the data, metadata, and parity are provided to the memory array 218 to be written along a word line specified by the row address to memory cells specified by the column address. The metadata may be written to at one or more locations along the word line based on whether BFMD storage is enabled or not.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands so that read data and metadata from the memory array 218 is provided to the ECC circuit 220. The ECC circuit 220 receives data bits, and parity bits from the array and detects and/or corrects errors in the data and metadata bits. The correct read data and metadata is provided along the data bus, and the data and metadata are output to outside from the data terminals DQ via the input/output circuit 222.

The device 200 includes refresh control circuits 216 each associated with a bank of the memory array 218. Each refresh control circuit 216 may determine when to perform a refresh operation on the associated bank. The refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

The ECC circuit 220 may detect and/or correct errors in the accessed data and metadata. As part of a write operation, the ECC circuit 220 may receive bits from the IO circuit 222 and generate parity bits based on those received bits. The received bits and parity bits are written to the memory array 218. During an example read operation, the ECC circuit 220 receives a set of bits and their associated parity bits from the array 218 and uses them to locate and/or correct errors. For example, in a single error correction (SEC) scheme, up to one bit of error may be located and detected. In a single error correction double error detection (SECDED) scheme, up to one bit of error may be corrected, but two errors may be detected (although the bits causing those errors are not individually located, so no correction can be made). The ECC circuit 220 may correct the information and then provide the corrected information (and/or a signal indicated detected errors) to the IO circuit 222. The parity bits may generally not be provided to the IO circuit 222.

The memory device 200 includes a setting register 230 may include various settings, and may be used to enable various BFMD settings of the memory 200. The setting register 230 may include settings stored in various places within the memory 200. For example, the setting register 230 may include settings in a mode register 232 and/or fuse array 234. The fuse array represents a collection of non-volatile storage elements (e.g., fuses) which may be programmed by permanently changing a state of the fuse. The mode register 232 includes a group of registers which store information about the memory 200 (e.g., temperature) as well as various settings that the memory uses to determine how to operate. In some embodiments, one or more registers of the mode register 232 may be loaded based on setting stored in the fuse array 234.

The memory 200 may be operated in various modes based on a number of the DQ pads which are used. In some embodiments, the setting register 230 may include settings which determine how many DQ pads are used, even if there are more DQ pads available. The mode may determine both how many DQ pads the controller expects to send/receive data along, as well as the format and/or number of bits which the controller expects as part of a single access command. For example, the memory may have 16 physical DQ pads. In a 2p2 mode, four of those DQ pads are used, divided into two pseudo-channels of two DQ pads each. The mode may also determine a burst length at each DQ terminal as part of a DQ operation. The burst length represents a number of serial bits at each DQ terminal during an access operation. For example, in the 2p2 mode, each data terminal may receive a burst of 32 data bits plus some number of metadata bits (e.g., either 2 or 4 per DQ terminal).

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
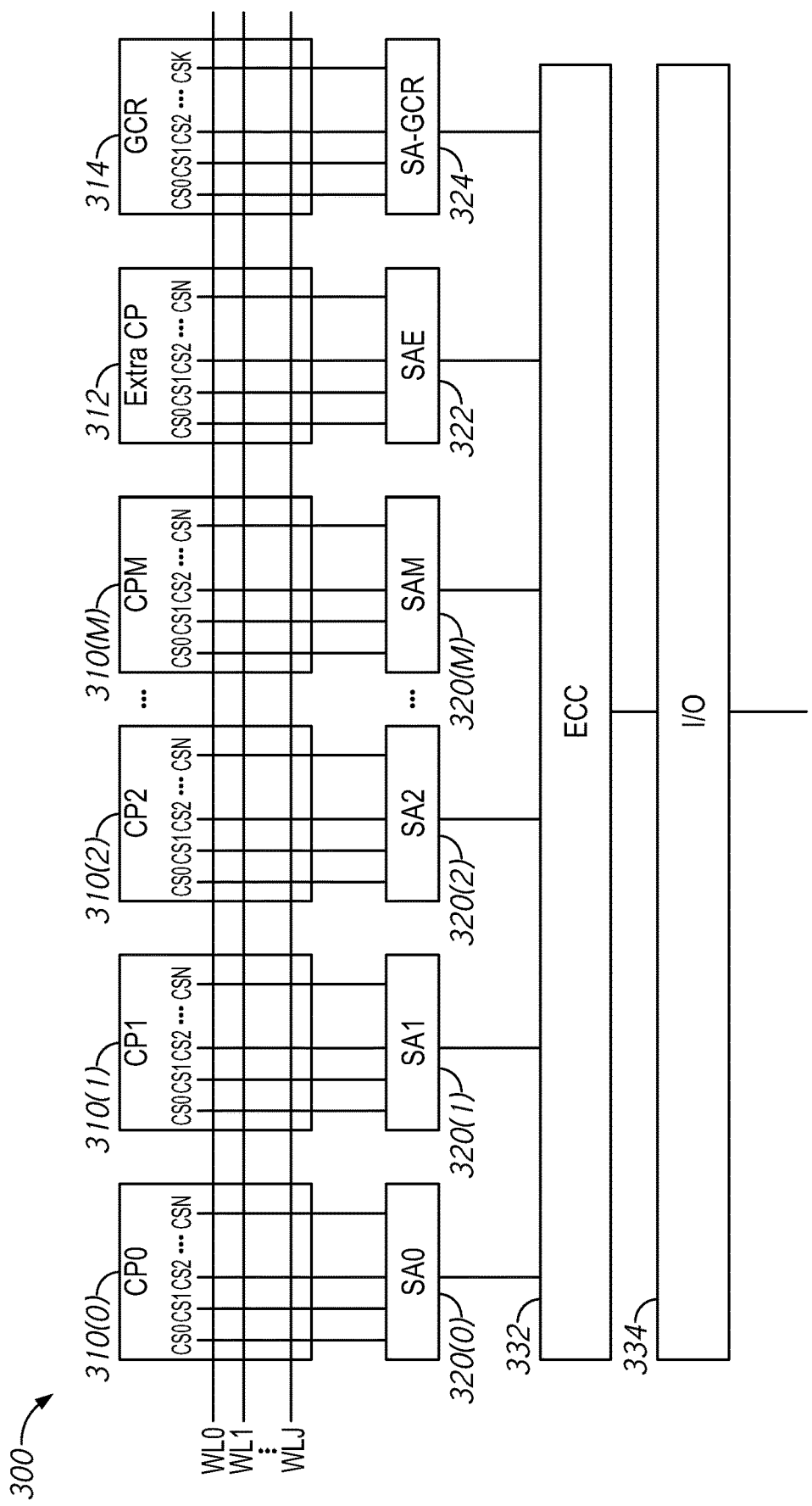
FIG. 3 is a block diagram of a memory device according to some embodiments of the present disclosure.

FIG. 3 is a block diagram of a memory device according to some embodiments of the present disclosure. The memory device 300 may, in some embodiments, represent a portion of the memory device 200 of FIG. 2. The view of FIG. 3 shows a portion of a memory array 310-314 and 320-324 which may be part of a memory bank (e.g., 218 of FIG. 2) along with selected circuits used in the data path such as the ECC circuit 332 (e.g., 220 of FIG. 2) and IO circuits 334 (e.g., 222 of FIG. 2). For clarity certain circuits and signals have been omitted from the view of FIG. 3.

The memory device 300 is organized into a number of column planes 310-314. Each of the column planes represents a portion of a memory bank. Each column plane 310-314 includes a number of memory cells at the intersection of word lines WL and bit lines. The bit lines may be grouped together into sets which are activated by a value of a column select (CS) signal. For the sake of clarity, only a single vertical line is used to represent the bit lines of each column select set, however, there may be multiple columns accessed by that value of CS. For example, each line may represent 8 bit lines, all accessed in common by a value of CS. As used herein, a 'value' of CS may refer to a decoded signal provided to sets of bit lines. So a first value may represent a first value of a multibit CS signal, or after decoding a signal line associated with that value being active. The word lines may be extend across multiple of the column planes 310-314.

The memory 300 includes a set of data column planes 310 as well as an extra column plane 312. The extra column plane 312 may be used to store additional information, such as error correction parity bits or metadata bits.

In some embodiments, the memory 300 may also include an optional global column redundancy (GCR) column plane 314. In some embodiments, the GCR plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

For example, in some embodiments the memory 310 may include 16 data column planes 310(0)-310(15). Each of those data column planes 310 includes 64 sets of bit lines activated by a value of the column select signal, and each set of bit lines includes 8 bit lines. Accordingly, when a word line is opened responsive to a row address, and a column select signal is provided to each of the 16 column planes then 8 bits are accessed from each of the 16 column planes for a total of 128 bits. A column select signal is also provided to the extra column plane 312, although that column select signal may be a different value than the one provided to the data column planes 310 for an additional 8 bits. If a repair has been performed, the GCR CP 314 may also be accessed and the value on a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 8 additional bits from the extra CP 312.

In the 2p2 architecture, fewer than 128 bits of data are accessed for a given access operation. Accordingly, only a portion of the data column planes 310 may be used to send/receive data. The column address may include a column plane select bit or bits which are used to determine which portion of the data column planes 310 are used. For example, the data column planes 310 may be split into two sets of eight data column planes each. A bit of the column address (e.g., CA10) may be used as the column plane select bit and may choose which set of data column planes is being used as part of the current access operation.

As described in more detail herein, during a given access operation, data may be stored in the portion of the column planes selected by the column plane select bit, while metadata (and in some cases parity) may be stored in one or more of the non-selected column planes. For example, the data may be stored in each column plane of the selected portion (e.g., 8 bits in each of 8 selected data column planes 310 for a total of 64 data bits). The metadata may be stored in one or more column planes 310 of the array in the non-selected portion. If BFMD storage is disabled, then the metadata may be stored in a single column plane in the non-selected portion. Depending on how many metadata bits are enabled, different numbers of bits may need to be stored. For example if 8B are enabled (across the module) then 8 bits may need to be stored, whereas if 4B are enabled, then 4 bits will be stored.

If BFMD storage is enabled, then the metadata may be stored in two different non-selected column planes 310, based on which DQ terminal the metadata was received along. For example, if the column plane select bit selects even data column planes, then the metadata may be stored in two different odd column planes. Depending on the amount of total metadata enabled, different numbers of metadata bits may be stored in the two locations. For example, if a total of 4B of metadata (across the module) are used, then 2 bits may be stored in each location. If a total of 8B of metadata (across the module) are used, then 4 bits may be stored in each location.

In some embodiments of the 2p2 architecture of the present disclosure, the parity bits may be store either in the extra column plane 312 or in one of the non-selected column planes. In an example implementation, each set of 64 data bits may be associated with 8 bits of parity generated by the ECC circuit 332. However, the extra column plane 312 may not have space for all of the parity bits. Accordingly, some parity bits may be stored in the extra column plane 312 and some may be stored in the non-selected data column planes 310 similar to the metadata (although the metadata and parity may be stored in different non-selected column planes for a given set of data bits).

In an example write operation, a controller (e.g., 150 of FIG. 1) provides data and metadata to the memory device which are written as part of a single access pass. In the example embodiment discussed herein, 64 bits of data are provided along with 4 or 8 bits of metadata, such that each of the two DQ terminals per pseudo-channel receives a burst length of 34 (32 data bits and 2 metadata bits) or 36 bits (32 data bits and 4 metadata bits). The data is provided to the ECC circuit 332 which generates a set of parity bits based on the data bits. For example 8 parity bits may be generated based on the 64 data bits. Based on the column address half of the data column planes 310 may be selected and the column decoder may provide a first value of the CS signal to the selected half of the column planes and provide a second value of the CS signal to the non-selected half of the column planes.

The data may be written to the memory cells at the intersection of the active word line and the bit lines selected by the first value of CS in the selected half of the column planes 310. The metadata may be written to the memory cells at the intersection of the active word line and the bit lines selected by the second value of CS in a selected one or more of the non-selected half of the column planes. For example, if the even column planes are selected, then metadata may be written to column planes 1 if BFMD storage is disabled or to column planes 1 and 5 if BFMD storage is enabled. Depending on the column address, the parity bits may either be written to the memory cells at the intersection of the word line and the bit lines selected by a CS signal (which may be the first CS value or a different value) in the extra column plane 312, or they may be written to the memory cells at the intersection of the word line and the bit lines selected by a third value of the CS signal in one of the non-selected column planes.

In some embodiments, when BFMD storage is enabled, since 8 bit lines are activated by each CS value, and there are either 2 or 4 metadata bits written to each location, it may be useful to protect the remaining 6 or 4 bits so they are not erroneously overwritten. For example, the memory may perform a read/modify/write cycle to read out all 8 bits, modify only the 2 or 4 which are being changed, and then write all 8 bits back. This may protect the unwritten bits along those bitlines from being improperly modified, however since data needs to be read as well as written, the overall time it takes to perform a write operation which includes a RMW on certain column planes will be increased.

In some embodiments, when BFMD is not enabled, either all 8 bitlines may be written to (e.g., because 8B of metadata are used) or separate write enable signals may be used such that only some of the sense amplifiers associated with the CS value are activated at one time (rather than all 8). For example, in 4B of metadata when BFMD is not enabled, only the sense amplifiers associated with the 4 bitlines which will store the new metadata bits may have active write enable signals. This may prevent the data on the bit lines coupled to the non-active sense amplifiers from being modified without requiring additional operations (e.g., a read/modify/write cycle) when BFMD storage is not enabled.

In an example read operation, the data, metadata, and parity are retrieved as part of a single access pass. For example, the second CS value is provided by the column decoder to the selected locations in the non-selected portion of the column planes 310 and the metadata is retrieved from the location(s) it was saved in. For example if BFMD storage is enabled then half the bits (e.g., 2 or 4 bits) are retrieved from one location and half the bits (e.g., 4 bits) are retrieved from the second location. If BFMD storage is not enabled, then the metadata bits are read from a single location. As part of the same access, the column decoder provides the first CS signal to the selected portion of the column planes 310 and the data bits are read from the column planes 310. The parity is retrieved either from the extra column plane 312 based on the first CS signal, or from another one of the non-selected column planes based on the third CS signal value. The data (e.g., 64 bits), metadata (e.g. 4 or 8 bits) and parity (e.g., 8 bits) are provided to the ECC circuit 232 which performs error correction on the data and metadata based on the data, metadata and parity bits. For example, the data and metadata may be used to generate a new set of parity which may be compared to the read parity to determine if there are differences. Those differences may be used to help identify if errors are present and in some embodiments, which bits are in error. The corrected data bits and the corrected metadata (e.g., either 4 or 8 bits) are provided to the I/O circuit 334, where they provided to the DQ terminals.

Figure 4:
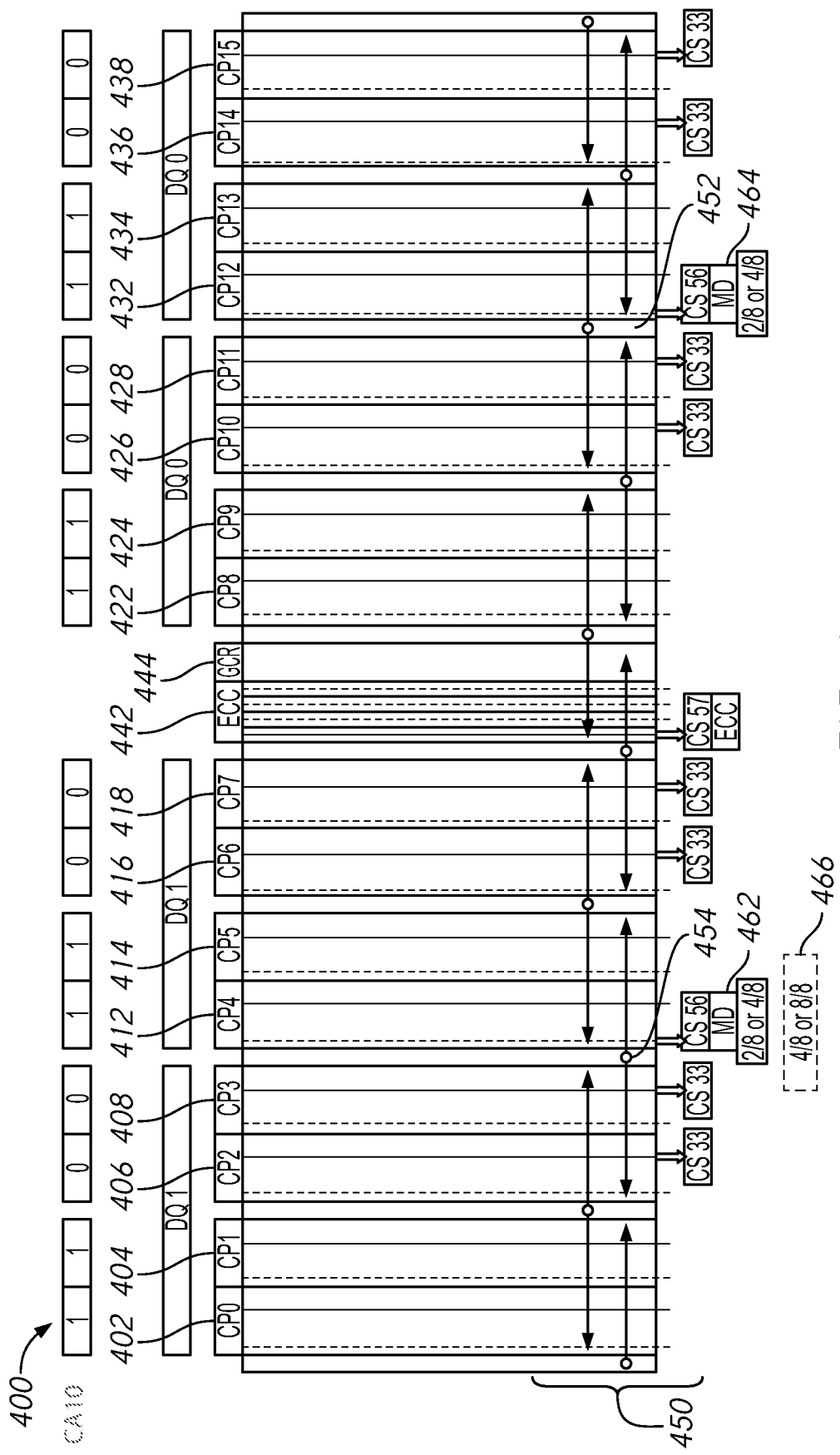
FIG. 4 is a block diagram of a memory array according to some embodiments of the present disclosure.

FIG. 4 is a block diagram of a memory array according to some embodiments of the present disclosure. The memory array 400 may represent the memory array in a memory device (e.g., 104 of FIG. 1) in a memory module (e.g., 102 of FIG. 1) which uses a 9×2p2 architecture or a 10×2p2 architecture with 4 or 8 bytes of metadata. For example, the memory array 400 may implement the memory array 218 of FIG. 2 and/or the column planes 310-314 of FIG. 2. The memory array 400 is shown for an example operation where data and metadata is accessed based on a row and column address for both BFMD storage enabled (boxes 462 and 464) and disabled (box 466). The access operation of FIG. 4 will generally be described with respect to a write operation, however it should be understood that a similar access pattern may be used for a read operation.

In the example implementation of FIG. 4, the memory is split into sixteen data column planes 402-438 (e.g., 310 of FIG. 3). In addition there is an extra column plane 442 (e.g., 312 of FIG. 3) used for parity information and a global column repair (GCR) column plane 444 (e.g., 314 of FIG. 3) used for repairs. Each of the column planes 402-438 includes a number of bit lines, organized into sets of 8 bit lines each accessed responsive to a value of a CS signal.

In an example access operation, a read or write signal may be received, for example from a controller (e.g., 150 of FIG. 1) external to the memory module. The memory may perform a single access operation, for example by issuing internal read or write commands along with values of the column select signal from a column decoder (e.g., 210 of FIG. 2). FIG. 4 shows an example mapping of where data, parity, and metadata associated with a received column address may be stored in the array 400. However other mappings may be used in other example embodiments.

As shown in FIG. 4, the different column planes may each be associated with a value of the column plane select bit in the column address. In the example of FIG. 4, the column address bit CA10 may be used to select the column planes. Accordingly, the column planes 402, 404, 412, 414, 422, 424, 432, and 434 are all selected when CA10 is a logical high (e.g., '1'). The column planes 406, 408, 416, 418, 426, 428, 436, and 438 are all selected when CA10 is a logical low (e.g., '0'). Other distributions of how different selected planes are grouped together, which bit is used for selection, how many bits are used for selection, etc., may be used in other example embodiments.

In an example write operation, a row address and column address are received. Responsive to the row address, sub word line drivers 450 are activated to power the conductive elements which make up the physical word line. For the sake of clarity, only a single word lines worth of sub-word line drivers 450 are shown. An ECC circuit, not shown in FIG. 4, such as 220 of FIGS. 2 and/or 332 of FIG. 3 generates parity bits based on the received data bits. During the access pass, the column decoder provides the column select signal, in this example with a value of CS 33, based on the received column address. This activates a set of 8 bit lines in each of the column planes which are selected by the column plane select bit, in this case column planes 406, 408, 416, 418, 426, 428, 436, and 438 (if a repair has been performed, also in GCR column plane 444). Eight data bits each are written to the memory cells at the intersection of the bit lines selected by CS33 and the active word line in the selected column planes for a total of 64 written data bits.

Data from different bursts received across the different DQ terminals may go to different column planes. For example, the data from DQ1 may be stored in column planes CP0-CP7 402-418, while data from DQ0 may be stored in CP8 to CP15 422 to 438.

During the same access pass, the metadata is stored in one or more column planes (depending on if BFMD storage is enabled or not) which are not selected by the column plane select bit (e.g., in this example in the column planes 402, 404, 412, 414, 422, 424, 432, and 434). In this example, when BFMD storage is enabled, the column decoder provides the CS signal with a value of CS56 to the column planes CP4 612 and CP12 632. The metadata may be split into two portions as represented by the boxes 462 and 464. Depending on the embodiment either two or four bits are written to each of the two locations. For example in a 4B embodiment, two bits are written to each location, while in an 8B embodiment, four bits are written to each location. The two column planes 412 and 432 may be coupled to different sub-word line drivers 454 and 452 respectively and may be associated with different DQ terminals (e.g., CP4 412 is associated with DQ1 and CP12 432 is associated with DQ0).

When BFMD storage is disabled all of the metadata bits may be written to a single location, in this case represented by box 466 where the metadata bits are written to CP4 414. For example, in a 4B embodiment, 4 bits are written to CS56 in CP4 412, and in an 8B embodiments, 8 bits are written to CS54 in CP4 412. While in this example the metadata bits are written to the same column plane, and to the same CS used for one of the locations when BFMD storage is enabled (e.g., boxes 462 and 466 share a CP and CS value), in other example embodiments, different locations and/or different CS values may be used when BFMD is enabled vs disabled. The metadata received from both DQ terminals may be written to a CP which is associated with only one of the DQs when BFMD storage is disabled.

When BFMD storage is enabled, a RMW operation may be used to protect the data along the bit lines associated with the CS value which are not being written to. For example, as part of an RMW cycle, all 8 bits may be read out from both of the two locations (e.g., 16 bits total) and then the selected bits may be modified to be overwritten with the new metadata bits before the modified bits are written back.

When BFMD storage is disabled, a RMW operation is not used. In the 8B embodiment this is because all 8 bits which are accessed by the CS value are being written to. In embodiments where less metadata bits are used, such as the 4B embodiment, an alternate method may be used to protect the extra bits. For example, the bit lines may alternate between being coupled to different read/write gaps of the memory array (e.g., an even write gap and an odd write gap). The two read/write gaps may be activated by separate write enable signals. This may allow for only half the bit lines associated with the CS value to be active at a time, which may protect the data along the non-selected bit lines.

As part of the same access pass, the parity bits generated by the ECC circuit may also be written to the memory array. In the example shown in FIG. 4, the parity bits are written to the extra column plane 442 (here labeled the ECC column plane). The column decoder generates a CS signal with a value of CS57 and the parity bits (e.g., 8 parity bits) are written to the memory cells at the intersection of the active word line and the bit lines activated by CS57 in the extra column plane 442. However, based on the column address, the parity bits may be written to one of the data column planes 402-438 instead. For example, the column decoder may provide CS57 (or some other CS value) and the parity bits may be written to memory cells in one of the non-selected column planes which is not being used for metadata (e.g., 402, 404, 414, 422, 424, or 434).

FIG. 5 is a diagram of an example settings register according to some embodiments of the present disclosure. The settings register 500 may, in some embodiments, implement various registers in the setting registers 105(0) to 105(7) and/or 113 of FIGS. 1 and/or 230 of FIG. 2. The setting register 500 is shown as a single table. However each line may be stored in a different location or a different type of location. For example, some settings shown in FIG. 5 may be stored in a fuse array (e.g., 234 of FIG. 2) while others are stored in a mode register (e.g., 232 of FIG. 2). In some embodiments, some of the settings shown in FIG. 5 may be stored in a settings register (e.g., 105 of FIGS. 1 and/or 230 of FIG. 2) associated with a memory device, while other settings may be stored in settings of the module (e.g., 102 of FIG. 1) such as in the settings register 113 of FIG. 1.

The settings register 500 includes a first setting BFMD_storage which acts as a BFMD storage setting. The BFMD_storage setting may, in some embodiments, be stored in a mode register or fuse array of a memory device. When BFMD_storage is enabled, the memory stores metadata from different DQ terminals in different locations (e.g., boxes 462 and 464 of FIG. 4). When BFMD_storage is disabled, the memory stores metadata from multiple DQ terminals in a same location (e.g., box 466 of FIG. 4). The state of BFMD_storage may generally be set based on the architecture of a memory module that the device was packaged on. For example, BFMD_storage may be enabled on a 9×2p2 module and disabled on a 10×2p2 module.

The settings register 500 includes a second setting BFMD_writetiming which may be used to control write timing when BFMD is active or not. The setting BFMD_writetiming may be used to control a minimum amount of time between write operations. For example, write operations may take more time when BFMD_storage is enabled, due to the RMW operation. Accordingly, the setting BFMD_writetiming may be a setting read by a controller (e.g., 150 of FIG. 1) to determine how quickly a second command may be sent after a write command. In some embodiments, the setting BFMD_writetiming may be stored in a location associated with properties of the memory such as settings register 113 of FIG. 1 (e.g., an SPD). The value of BFMD_writetiming may generally match the value of BFMD_storage (e.g., both are enabled or both are disabled). When BFMD_writetiming is enabled, a write timing control circuit (e.g., 152 of FIG. 1) of the controller may increase a delay after each write operation compared to when the setting BFMD_writetiming is disabled. For example, when enabled, the write timing delay may be roughly twice when the setting is disabled.

The setting register 500 includes a third setting BFMD_override. In some embodiments, a customer may wish to override BFMD_storage settings, which may be set at a factory, and programmed in a manner (e.g., by blowing fuses or in a read only mode register) which is difficult to change. Rather than directly changing the values of BFMD_storage and BFMD_writetiming, an override setting BFMD_override may be used. When BFMD_override is enabled, then the memory and controller will operate as if BFMD_storage and BFMD_writetiming are both disabled, regardless of what the values of those settings are. If BFMD_override is disabled, then the values of BFMD_storage and BFMD_writetiming may govern the operation.

Figure 6:
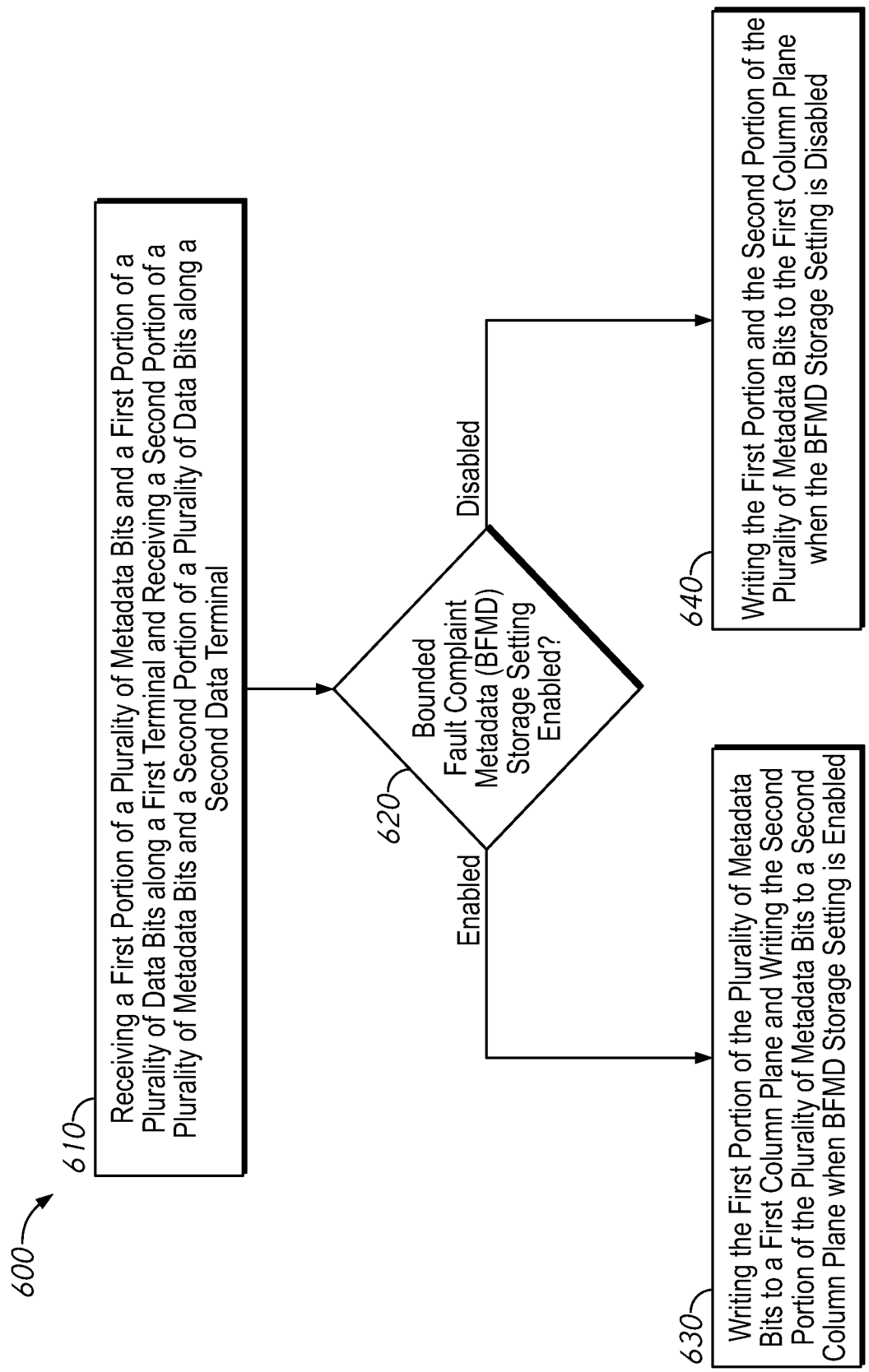
FIG. 6 is a flow chart of a method of writing data and metadata to a memory device according to some embodiments of the present disclosure.

FIG. 6 is a flow chart of a method of writing data and metadata to a memory device according to some embodiments of the present disclosure. The method 600 represents a method of writing data to a memory device, such as one of the memory devices 104 of FIG. 1, 200 of FIG. 2, the arrays 300 of FIGS. 3 and/or 400 of FIG. 4.

The method 600 begins with block 610, which describes receiving a first portion of a plurality of metadata bits and a first portion of a plurality of data bits along a first data terminal and receiving a second portion of a plurality of metadata bits and a second portion of a plurality of data bits along a second data terminal. For example, in a 9×2p2 or a 10×2p2 architecture, the method 600 may include receiving 32 data bits along the first terminal and 32 data bits along the second terminal, as well as receiving 2 (or 4) metadata bits along the first terminal (for a total burst of 34 or 36 bits) and 2 or 4 metadata bits along the second terminal (for a total burst of 34 or 36 bits). The method 600 may include receiving a row and column address, as well as a write command associated with the data and metadata bits. For example, the row address, column address, write command, data and metadata may all be received from a controller at external C/A and DQ terminals (e.g., 114 and 124 of FIG. 1) and routed through internal buses to the memory device.

Block 610 may generally be followed by block 620, which describes determining if a bounded fault compliant metadata (BFMD) storage setting is enabled or disabled. The setting may be stored in a setting register such as 105 of FIG. 1, 113 of FIG. 1, 230 of FIG. 2, and/or 500 of FIG. 5. A column decoder of the memory (e.g., 210 of FIG. 2) may use the state of the BFMD storage setting to determine which bit lines to access as part of the write operation. In some embodiments, the method 600 may include setting a value of the BFMD storage setting, for example, setting the value based on an architecture of the memory module that the memory device is packaged on. In some embodiments, the method 600 may include enabling the BFMD storage setting if the memory is on a 9×2p2 module and disabling the BFMD storage setting if the memory is on a 10×2p2 module.

If the BFMD storage setting is enabled, the method may proceed to block 630, which describes writing the first portion of the plurality of metadata bits to a first column plane and writing the second portion of the plurality of metadata bits to a second column plane when BFMD storage setting is enabled. The metadata bits from different DQ terminals may be written to different locations (e.g., column planes). The locations may be remote from each other. For example the two locations may be along different sub-word line drivers. In some example embodiments, the method may include activating a first sub-word line driver associated with the first column plane and activating a second sub-word line driver associated with the second column plane. The method 600 may include performing a read/modify/write operation to write the first and the second portions of the metadata to their respective locations.

If the BFMD storage setting is disabled, the method may proceed to block 640, which describes writing the first portion and the second portion of the plurality of metadata bits to the first column plane when the BFMD storage setting is disabled. The metadata from DQ terminals may be written to a same location when BFMD storage is disabled. The writing step of box 640 may be a write operation (rather than the RMW operation of box 630). Accordingly, the write operation of box 640 may take less time than the write operation of box 630.

The method 600 may include selecting a first portion or a second portion of a plurality of column planes. For example, a column decoder (e.g., 210 of FIG. 2) may select the first or second portion based on a column plane select bit (e.g., CA10) of the column address. The method 600 may include writing the first and the second portion of the data to column planes in the selected one of the first portion or the second portion of the plurality of column planes. The first and second column planes which the metadata are written to may be in the non-selected one of the first and the second portion of the plurality of column planes.

The method 600 may include generating a first column select value based on the column address and providing the first column select value to the selected first portion or second portion of the plurality of column planes. The method 600 may include generating a second column select value based on the column address and providing the second column select value to the first column plane and the second column in the non-selected one of the first portion or the second portion of the plurality of column planes. In some embodiments, the first and the second CS values may be different from each other.

In some embodiments, the method 600 may include generating a plurality of parity bits based on the plurality of data bits, for example with an ECC circuit (e.g., 220 of FIGS. 2 and/or 332 of FIG. 3). The method 600 may include writing the plurality of parity bits to an extra column plane (e.g., 312 of FIGS. 3 and/or 442 of FIG. 4) or to one of the non-selected one of the first or the second portion of the plurality of column planes. In some embodiments, the method 600 may include generating a third value of the CS signal with the column decoder and providing the third value of the CS signal to the column plane where the parity is being stored. In some embodiments, the third value of the CS signal may be the same as the first or the second CS value or different from either.

In some embodiments, the method 600 may include overriding a state of the BFMD storage setting based on a BFMD override setting. For example, if the BFMD storage override is enabled, the method 600 may include writing the first portion and the second portion of the metadata bits to the first column plane regardless of the state of the BFMD storage setting (e.g., box 640). If the BFMD override setting is disabled, then the BFMD storage setting may determine whether box 630 or 640 is used.

In some embodiments, the method 600 may include reading a BFMD write timing setting from a memory module. For example, a controller (e.g., 150 of FIG. 1) may read the BFMD write timing setting (e.g., from a settings register 113 of FIG. 1 such as an SPD and/or from settings registers such as 105 of FIG. 1 associated with the individual memories) and a write timing control circuit of the controller (e.g., 152 of FIG. 1) may adjust a write timing delay accordingly. The method 600 may include waiting a first amount of time after providing a write command before issuing a second command if the BFMD write timing setting is enabled and waiting a second amount of time if the BFMD write timing setting is disabled. The first amount of time may be longer than the second amount of time. In some embodiments, the first amount of time may be roughly double the length of the first amount of time.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
    receiving a first portion of a plurality of metadata bits and a first portion of a plurality of data bits along a first data terminal and receiving a second portion of a plurality of metadata bits and a second portion of a plurality of data bits along a second data terminal;
    determining if a bounded fault compliant metadata (BFMD) storage setting is enabled;
    writing the first portion of the plurality of metadata bits to a first column plane and writing the second portion of the plurality of metadata bits to a second column plane when the BFMD storage setting is enabled; and
    writing the first portion and the second portion of the plurality of metadata bits to the first column plane when the BFMD storage setting is disabled.

2. The method of claim 1, further comprising:
    selecting a first portion or a second portion of a plurality of column planes based on a column plane select bit of a column address;
    writing the first portion and the second portion of the plurality of data bits to the selected one of the first portion or the second portion of the plurality of column planes,
    wherein the first column plane and the second column plane are in a non-selected one of the first portion or the second portion of the plurality of column planes.

3. The method of claim 2, further comprising:
    generating a plurality of parity bits based on the plurality of data bits; and
    writing the plurality of parity bits to an extra column plane or a third column plane, wherein the third column plane are in the non-selected one of the first portion or the second portion of the plurality of column planes.

4. The method of claim 1, further comprising:
    determining if a BFMD override setting is enabled;
    writing the first portion and the second portion of the plurality of metadata bits to the first column plane if the BFMD override setting is enabled regardless of the state of the BFMD storage setting.

5. The method of claim 1, further comprising:
    determining if a BFMD write timing setting is enabled or disabled;
    providing a write command along with the plurality of data bits and the plurality of metadata bits;
    waiting a first amount of time after providing the write command before providing a next command if the BFMD write timing setting is enabled; and
    waiting a second amount of time after providing the write command before providing the next command if the BFMD write timing setting is disabled.

6. The method of claim 1, further comprising setting a value of the BFMD storage setting based on an architecture of a memory module.

7. An apparatus comprising:
    a first data terminal configured to receive a first portion of a plurality of metadata bits and a first portion of a plurality of data bits;
    a second data terminal configured to receive a second portion of a plurality of metadata bits and a second portion of a plurality of data bits;
    a memory array comprising a first column plane and a second column plane;
    a settings register comprising a first setting; and
    a column decoder configured to store the first portion of the metadata in the first column plane and the second portion of the metadata in the second column plane when the first setting is enabled and configured to store the first portion and the second portion of the metadata in the first column plane when the setting is disabled.

8. The apparatus of claim 7, wherein the column decoder is configured to write the first portion and the second portion of the plurality of metadata bits using a read/modify/write operation when the first setting is enabled and to write the first portion and the second portion of the plurality of metadata bits using a write operation when the first setting is disabled.

9. The apparatus of claim 7, wherein the settings register includes a mode register, a fuse array, or combinations thereof.

10. The apparatus of claim 7, wherein the settings register comprises a second setting, and wherein the second setting indicates a first amount of time for a write delay or a second amount of time for the write delay, wherein the first amount of time is longer than the first amount of time.

11. The apparatus of claim 7, wherein the settings register comprises a third setting, and wherein when the third setting is enabled the first portion and the second portion of the plurality of metadata bits are stored in the first column plane regardless of the state of the first setting.

12. The apparatus of claim 7, wherein the memory array is part of a memory device packaged on a module and wherein the first setting is set based on an architecture of the module.

13. The apparatus of claim 7, wherein the column decoder is configured to select a first portion or a second portion of a plurality of column planes based on a column plane select bit of the column address, and wherein the plurality of data bits are stored in the selected one of the first portion or the second portion of the plurality of column planes and wherein the first column plane and the second column plane are part of the non-selected one of the first portion or the second portion of the plurality of column planes.

14. The apparatus of claim 7, wherein the first column plane and the second column plane do not share a sub-word line driver.

15. A system comprising:
    a controller configured to provide a plurality of data bits and a plurality of metadata bits along with a write command as part of a write operation;
    a memory module including:
        a settings register configured to store a first setting;
        a first data terminal configured to receive a first portion of the plurality of metadata bits and a first portion of the plurality of data bits;
        a second data terminal configured to receive a second portion of a plurality of metadata bits and a second portion of a plurality of data bits;
        a memory array comprising a first column plane and a second column plane;
        a column decoder configured to write the first portion of the plurality of metadata bits in the first column plane and the second portion of the plurality of metadata bits in the second column plane when the first setting is enabled and configured to write the first portion and the second portion of the plurality of metadata bits to the first column plane when the first setting is disabled.

16. The system of claim 15, wherein the settings register is further configured to store a second setting, and
    wherein the controller is configured to wait a write delay amount of time after providing the write command before providing another command, wherein the write delay is a first amount of time if the second setting is enabled and a second amount of time if the second setting is disabled.

17. The system of claim 16, wherein the settings register includes a Serial Presence Detect (SPD) and the second setting is stored in the SPD.

18. The system of claim 16, wherein the first amount of time is about double the first amount of time.

19. The system of claim 15, wherein the settings register is further configured to store an override setting, and wherein when the override setting is enabled, the column decoder is configured to write the first and the second portion of the plurality of metadata bits in the first column plane regardless of the first setting.

20. The system of claim 15 wherein the first column plane and the second column plane are remote from each other.

* * * * *